(12) United States Patent
Sasaki et al.

(10) Patent No.: US 11,573,537 B2
(45) Date of Patent: Feb. 7, 2023

(54) APPARATUS, METHOD AND RECORDING MEDIUM FOR CONTROLLING SYSTEM USING TEMPORAL DIFFERENCE ERROR

(71) Applicants: FUJITSU LIMITED, Kawasaki (JP); Okinawa Institute of Science and Technology School Corporation, Okinawa (JP)

(72) Inventors: Tomotake Sasaki, Kawasaki (JP); Eiji Uchibe, Kunigami (JP); Kenji Doya, Kunigami (JP); Hirokazu Anai, Hachioji (JP); Hitoshi Yanami, Kawasaki (JP); Hidenao Iwane, Kawasaki (JP)

(73) Assignees: FUJITSU LIMITED, Kawasaki (JP); OKINAWA INSTITUTE OF SCIENCE AND TECHNOLOGY SCHOOL CORPORATION, Kunigami (JP)

( * ) Notice: Subject to any disclaimer, the term of this patent is extended or adjusted under 35 U.S.C. 154(b) by 1183 days.

(21) Appl. No.: 16/130,469

(22) Filed: Sep. 13, 2018

(65) Prior Publication Data
US 2019/0086876 A1    Mar. 21, 2019

(30) Foreign Application Priority Data
Sep. 15, 2017    (JP) .............................. JP2017-177985

(51) Int. Cl.
G05B 13/02    (2006.01)
G06F 17/16    (2006.01)
(Continued)

(52) U.S. Cl.
CPC ......... G05B 13/025 (2013.01); G05B 13/022 (2013.01); G05B 13/0265 (2013.01);
(Continued)

(58) Field of Classification Search
None
See application file for complete search history.

(56) References Cited

U.S. PATENT DOCUMENTS

| | | | | |
|---|---|---|---|---|
| 6,000,827 A | * | 12/1999 | Hosogi | G05B 17/02 700/48 |
| 10,739,733 B1 | * | 8/2020 | Saxena | G05B 19/042 |

(Continued)

OTHER PUBLICATIONS

Lewis et al. 'Reinforcement Learning and Adaptive Dynamic Programming for Feedback Control' IEEE Circuits and Systems Magazine, IEEE published 2009.*
(Continued)

*Primary Examiner* — Bernard G Lindsay
(74) *Attorney, Agent, or Firm* — Staas & Halsey LLP

(57) ABSTRACT

A non-transitory, computer-readable recording medium stores a program of reinforcement learning by a state-value function. The program causes a computer to execute a process including calculating a temporal difference (TD) error based on an estimated state-value function, the TD error being calculated by giving a perturbation to each component of a feedback coefficient matrix that provides a policy; calculating based on the TD error and the perturbation, an estimated gradient function matrix acquired by estimating a gradient function matrix of the state-value function with respect to the feedback coefficient matrix for a state of a controlled object, when state variation of the controlled object in the reinforcement learning is described by a linear difference equation and an immediate cost or an immediate reward of the controlled object is described in a quadratic form of the state and an input; and updating the feedback coefficient matrix using the estimated gradient function matrix.

12 Claims, 10 Drawing Sheets

(51) Int. Cl.
G06N 20/00 (2019.01)
G06N 3/00 (2006.01)
G05B 13/04 (2006.01)

(52) U.S. Cl.
CPC ......... *G05B 13/042* (2013.01); *G05B 13/048* (2013.01); *G06F 17/16* (2013.01); *G06N 3/006* (2013.01); *G06N 20/00* (2019.01)

(56) References Cited

U.S. PATENT DOCUMENTS

| | | | | |
|---|---|---|---|---|
| 2011/0059427 | A1* | 3/2011 | Hans | G05B 13/0265 434/322 |
| 2011/0257799 | A1* | 10/2011 | Al-Hamouz | G05B 13/0265 700/287 |
| 2017/0227936 | A1* | 8/2017 | Munakata | G05B 11/42 |
| 2017/0322523 | A1* | 11/2017 | Vau | G05B 19/19 |
| 2018/0134118 | A1* | 5/2018 | Hintea | B60H 1/00742 |
| 2018/0158152 | A1* | 6/2018 | Jereminov | H02J 3/16 |
| 2020/0096013 | A1* | 3/2020 | Zehetleitner | G05B 13/045 |

OTHER PUBLICATIONS

Ruvolo et al. 'Control by Gradient Collocation: Applications to Optimal Obstacle Avoidance and Minimum Torque Control' 2012 IEEE/RSJ International Conference on Intelligent Robots and Systems, Oct. 7-12, 2012.*

Steven J. Bradtke et al., "Adaptive linear quadratic control using policy iteration", American Control Conference, Baltimore, Maryland, Jun. 1994, pp. 3475-3479.

David Silver et al., "Deterministic Policy Gradient Algorithms", In Proc. of the 31st International Conference on Machine Learning, 2014, pp. 387-395.

Hado van Hasselt, "Reinforcement Learning in Continuous State and Action Spaces", In Reinforcement Learning Springer Berlin Heidelberg, 2012, pp. 207-251.

Busoniu et al., "Reinforcement Learning and Dynamic Programming Using Function Approximators", CRC press, 2010, pp. 105-106.

Marc Peter Deisenroth et al., "A Survey on Policy Search for Robotics", Foundations and Trends in Robotics: vol. 2: No. 1-2, 2013, pp. 1-142.

Yunmin Zhu et al., "Recursive Least Squares With Linear Constraints", Communications in Information and Systems, vol. 7, No. 3, 2007, pp. 287-312.

Christoph Dann et al., "Policy Evaluation with Temporal Differences: A Survey and Comparison", Journal of Machine Learning Research 15, 2014, pp. 809-883.

Kemin Zhou et al., "Robust and Optimal Control", Prentice Hall, 1996, ISBN:0-13-456567-3, 2 pages total.

Bernstein, "Matrix Mathematics, second edition", Princeton University Press, 2009, 6 pages total.

* cited by examiner

US 11,573,537 B2

APPARATUS, METHOD AND RECORDING MEDIUM FOR CONTROLLING SYSTEM USING TEMPORAL DIFFERENCE ERROR

CROSS REFERENCE TO RELATED APPLICATIONS

This application is based upon and claims the benefit of priority of the prior Japanese Patent Application No. 2017-177985, filed on Sep. 15, 2017, the entire contents of which are incorporated herein by reference.

FIELD

The embodiments discussed herein relate to a recording medium, a policy improving method, and a policy improving apparatus.

BACKGROUND

A technique of reinforcement learning has traditionally been present according to which, based on an immediate cost or an immediate reward given to a controlled object corresponding to an input for the controlled object, a value function representing an accumulated cost or an accumulated reward of the controlled object is improved to thereby improve the policy for the accumulated cost or the accumulated reward to be optimized. The value function is a state-action-value function (a Q function), a state-value function (a V function), or the like.

For example, a technique of continuous actor-critic learning automaton (Cacla) is present as a prior art. According to the technique, a perturbation is added to an input, a temporal difference (TD) error relative to the input is calculated, and a feedback coefficient matrix that provides a policy is updated based on the TD error. For examples, refer to S. J. Bradtke, B. E. Ydstie and A. G. Barto, "Adaptive linear quadratic control using policy iteration", In Proc. of the 1994 American Control Conference, pp. 3475-3479, Baltimore, USA, 1994; D. Silver, G. Lever, N. Heess, T. Degris, D. Wierstra and M. Riedmiller, "Deterministic policy gradient algorithms", In Proc. of the 31st International Conference on Machine Learning, pp. 387-395, 2014; H. Van Hassett, Reinforcement learning in continuous state and action spaces, In Reinforcement Learning (pp. 207-251), Springer, Berlin Heidelberg, 2012; L. Busoniu, R. Babuska, B. De Schutter, and D. Ernst, Reinforcement Learning and Dynamic Programming Using Function Approximators, CRC press, 2010; M. P. Deisenroth, G. Neumann and J. Peters, "A Survey on Policy Search for Robotics", Foundations and Trends in Robotics, Vol. 2, No. 1-2, pp. 1-142, 2013.

SUMMARY

According to an aspect of an embodiment, a non-transitory, computer-readable recording medium stores therein a policy improvement program of reinforcement learning by a state-value function. The policy improvement program causes a computer to execute a process including calculating a TD error based on an estimated state-value function that is acquired by estimating the state-value function, the TD error being calculated by giving a perturbation to each of the components of a feedback coefficient matrix that provides a policy; calculating based on the TD error and the perturbation, an estimated gradient function matrix acquired by estimating a gradient function matrix of the state-value function with respect to the feedback coefficient matrix for a state of a controlled object, when state variation of the controlled object in the reinforcement learning is described by a linear difference equation and an immediate cost or an immediate reward of the controlled object is described in a quadratic form of the state and an input; and updating the feedback coefficient matrix using the estimated gradient function matrix.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF THE INVENTION

First, problems associated with the traditional techniques will be discussed. With the traditional techniques, it may be difficult to update the feedback coefficient matrix that provides the policy and thus, difficult to efficiently improve the policy. For example, it may be difficult to determine what size of perturbation is to be added to the input or the feedback coefficient matrix to optimize the accumulated cost or the accumulated reward and thus, it may be difficult to improve the feedback coefficient matrix that provides the policy.

Embodiments of a recording medium storing a policy improving program, a policy improving method, and a policy improving apparatus according to the present disclosure will be described in detail with reference to the accompanying drawings.

Figure 1:
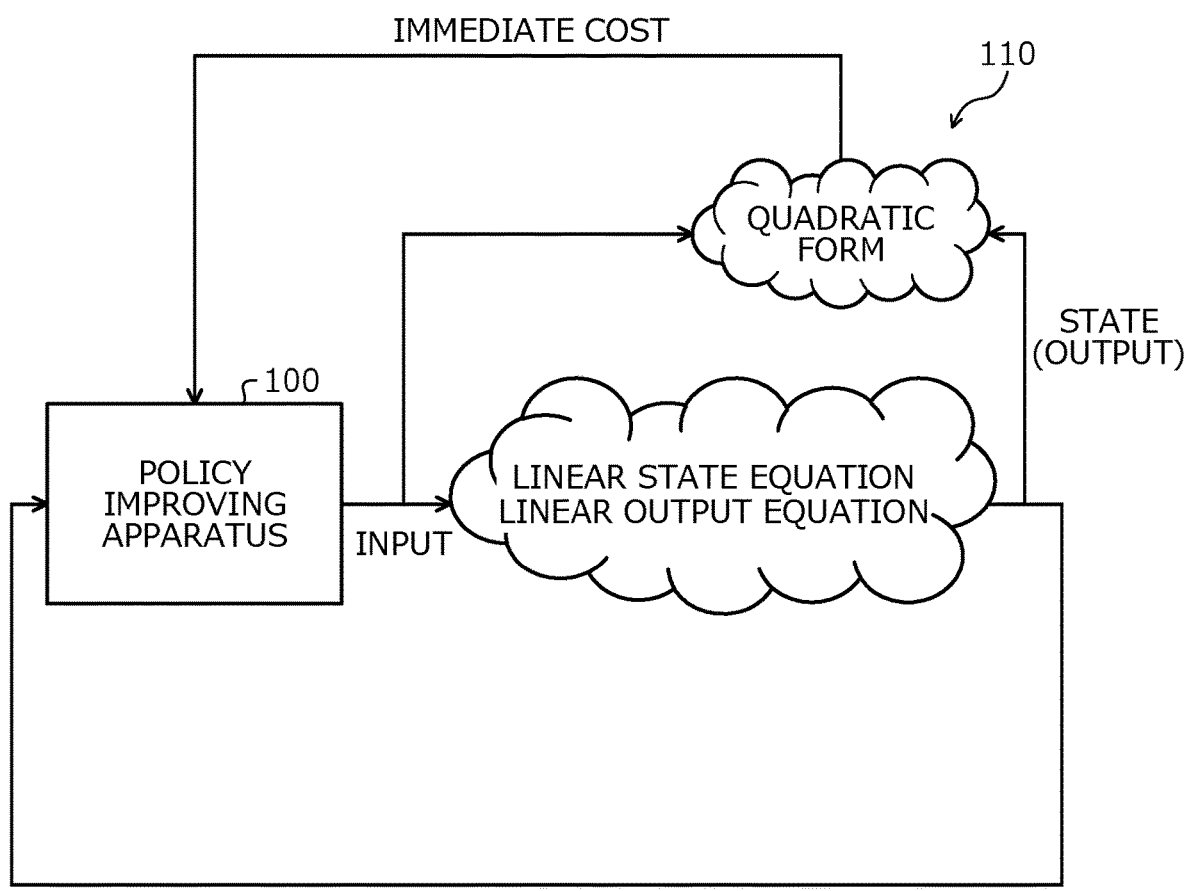
FIG. 1 is an explanatory diagram of an EXAMPLE of a policy improving method according to an embodiment.

FIG. 1 is an explanatory diagram of an EXAMPLE of the policy improving method according to the embodiment. The policy improving apparatus 100 is a computer that improves a policy at a predetermined timing, determines an input for a controlled object 110 based on the policy, and thereby controls the controlled object 110. The policy improving apparatus 100 is, for example, a server, a personal computer (PC), or a microcontroller.

The controlled object 110 is a certain object and is, for example, a physical system that actually exists. The controlled object is also referred to as "environment". The controlled object 110 is, for example, a server room or an electric generator. The policy is an equation to determine an input value for the controlled object 110 by a feedback coefficient matrix. The policy is also referred to as "control law".

The improvement of the policy corresponds to updating of the feedback coefficient matrix that provides the policy. The improvement of the policy refers to changing of the policy for optimizing the accumulated cost or the accumulated reward efficiently. The input is an operation executed for the controlled object 110. The input is also referred to as "action". The state of the controlled object 110 is varied corresponding to the input for the controlled object 110.

With reference to S. J. Bradtke, B. E. Ydstie and A. G. Barto, "Adaptive linear quadratic control using policy iteration", In Proc. of the 1994 American Control Conference, pp. 3475-3479, Baltimore, USA, 1994; D. Silver, G. Lever, N. Heess, T. Degris, D. Wierstra and M. Riedmiller, "Deterministic policy gradient algorithms", In Proc. of the 31st International Conference on Machine Learning, pp. 387-395, 2014; H. Van Hassett, Reinforcement learning in continuous state and action spaces, In Reinforcement Learning (pp. 207-251), Springer, Berlin Heidelberg, 2012; L. Busoniu, R. Babuska, B. De Schutter, and D. Ernst, Reinforcement Learning and Dynamic Programming Using Function Approximators, CRC press, 2010; M. P. Deisenroth, G. Neumann and J. Peters, "A Survey on Policy Search for Robotics", Foundations and Trends in Robotics, Vol. 2, No. 1-2, pp. 1-142, 2013, some control approaches may be considered for updating the feedback coefficient matrix that provides the policy, thereby facilitating improvement of the policy, and controlling the controlled object 110. For example, a first control approach may be considered that employs a state-action-value function as the value function.

With the first control approach, however, it is difficult to efficiently improve the policy for optimizing the accumulated cost or the accumulated reward when the input and the state of the controlled object 110 have a relationship of linear dependence. The optimization of the accumulated cost or the accumulated reward corresponds to minimization of the accumulated cost or maximization of the accumulated reward represented by the state-value function.

In contrast, even when the input and the state of the controlled object 110 have a relationship of linear dependence, a second control approach and a third control approach may be considered that each employ the state-value function as the value function to facilitate efficient improvement of the policy.

For example, as the second control approach, a control approach may be considered where, like Cacla, a perturbation is added to an input generated by the policy and the feedback coefficient matrix that provides the policy is updated based on TD error relative to the input. As to the second control approach, it is however difficult to determine what size of perturbation is to be added to the input for optimizing the accumulated cost or the accumulated reward.

There is a nature for the policy to be varied advantageously in a direction along a gradient of the state-value function to optimize the accumulated cost or the accumulated reward. With the second control approach, however, the perturbation is generated regardless of the gradient of the state-value function because it is difficult to determine the gradient of the state-value function. Therefore, with the second control approach, the size of the perturbation added to the input is repeatedly varied in attempt to optimize the accumulated cost or the accumulated reward, and it is difficult to efficiently improve the policy so that the accumulated cost or the accumulated reward is efficiently improved.

For example, as the third control approach, a control approach may be considered in which a perturbation matrix is added to the feedback coefficient matrix that provides the policy and the feedback coefficient matrix that provides the policy is updated based on the TD error concerning the feedback coefficient matrix relative to the input. With the third control approach, however, it is difficult to determine what perturbation matrix is to be added to the feedback coefficient matrix for the accumulated cost or the accumulated reward to be optimized.

There is a nature for the feedback coefficient matrix to be varied advantageously in a direction along a gradient of the state-value function to optimize the accumulated cost or the accumulated reward. With the third control approach, however, the perturbation matrix is generated regardless of the gradient of the state-value function because it is difficult to determine the gradient of the state-value function. Therefore, with the third control approach, the size of each of the components of the perturbation matrix added to the feedback coefficient matrix is repeatedly varied in attempt to optimize the accumulated cost or the accumulated reward. As a result, with the third control approach, it is difficult to efficiently improve the policy so that the accumulated cost or the accumulated reward is efficiently optimized.

In this embodiment, a policy improving method will be described in which a partial derivative that represents a degree of reaction to the perturbation for each of the components of the feedback coefficient matrix that provides the policy is calculated, using the nature of the controlled object 110. According to this policy improving method, based on the calculated partial differential, the gradient function matrix of the state-value function concerning the feedback coefficient matrix for the state may be estimated and the feedback coefficient matrix may be updated efficiently so that the accumulated cost or the accumulated reward is optimized.

In the example of FIG. 1, the controlled object 110 is a situation where the state variation of the controlled object 110 is represented by a discrete-time linear time-invariant state equation and coefficient matrices of the state equation and the equation in the quadratic form of the immediate cost or the immediate reward, of the controlled object 110 are unknown. The controlled object 110 is in a situation where the state of the controlled object 110 becomes the output and the state of the controlled object 110 is directly observed.

In the example of FIG. 1, the state variation of the controlled object 110 is described by a linear difference equation, and the immediate cost or the immediate reward of the controlled object 110 is defined in the quadratic form of the state of the controlled object 110 and the input to the controlled object 110.

The policy improving apparatus 100 generates the TD error based on an estimated state-value function acquired by estimating the state-value function, by giving the perturbation to each of the components of the feedback coefficient matrix that provides the policy. A specific example of calculating the TD error will be described later with reference to, for example, FIGS. 8 and 9. The policy improving apparatus 100 may thereby acquire the result of the partial differential that represents the degree of the reaction to the perturbation for each of the components of the feedback coefficient matrix.

Based on the TD error and the perturbation, the policy improving apparatus 100 generates an estimated gradient function matrix acquired by estimating the gradient function matrix of the state-value function concerning the feedback coefficient matrix for the state. A specific example of calculating the estimated gradient function matrix will be described later with reference to, for example, FIGS. 9 and 10. The policy improving apparatus 100 may thereby generate the estimated gradient function matrix in which an arbitrary state may substituted therein.

The policy improving apparatus 100 updates the feedback coefficient matrix using the estimated gradient function matrix. A specific example of updating the feedback coefficient matrix will be described later with reference to, for example, FIG. 10. The policy improving apparatus 100 may thereby update the feedback coefficient matrix based on an estimated value of the estimated gradient function matrix in which an arbitrary state is substituted therein.

The policy improving apparatus 100 may thereby determine what perturbation matrix is to be added to the feedback coefficient matrix so that the accumulated cost or the accumulated reward is optimized. As a result, the policy improving apparatus 100 may improve the state-value function, update the feedback coefficient matrix for the accumulated cost or the accumulated reward to efficiently be optimized, and efficiently improve the policy. The improvement of the state-value function refers to the value of the value function becoming smaller in all the states for the accumulated cost, and the value of the value function becoming greater in all the states for the accumulated reward.

An example of a hardware configuration of the policy improving apparatus 100 depicted in FIG. 1 will be described using FIG. 2.

Figure 2:
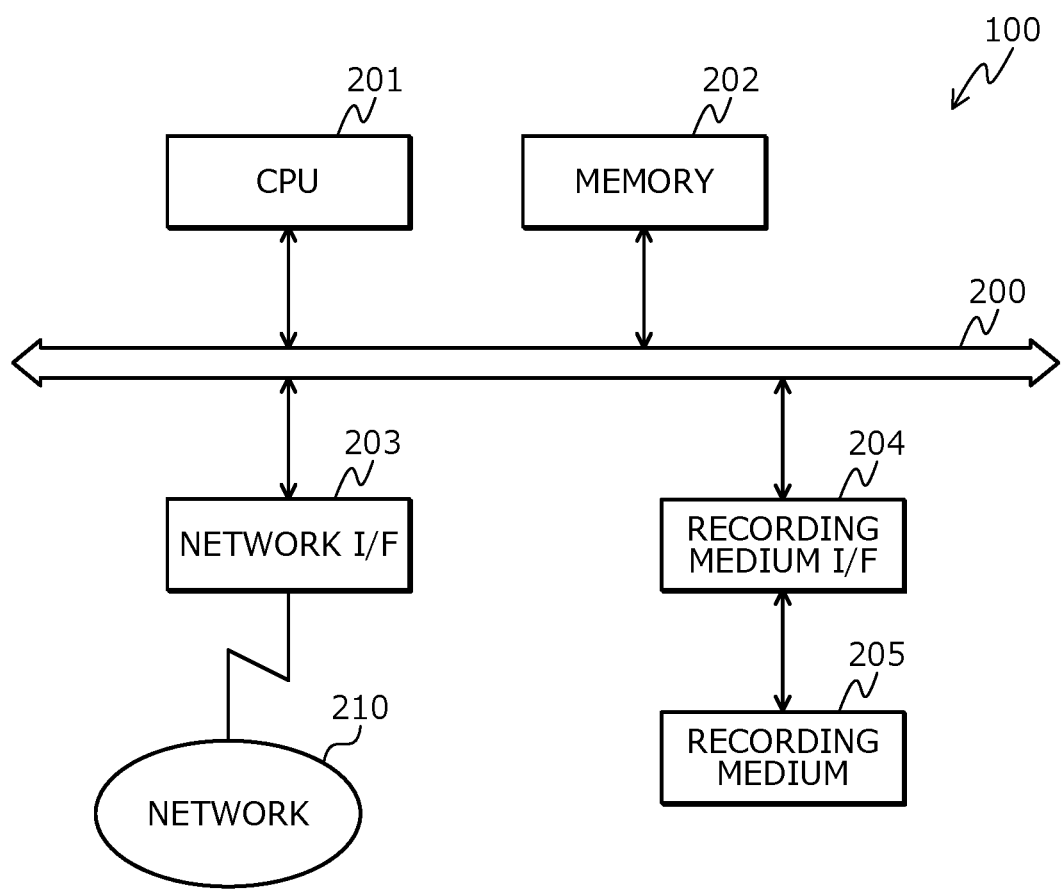
FIG. 2 is a block diagram depicting an example of a hardware configuration of a policy improving apparatus 100.

FIG. 2 is a block diagram depicting an example of a hardware configuration of the policy improving apparatus 100. In FIG. 2, the policy improving apparatus 100 includes a central processing unit (CPU) 201, a memory 202, a network interface (I/F) 203, a recording medium I/F 204, and a recording medium 205, respectively connected by a bus 200.

Here, the CPU 201 governs overall control of the policy improving apparatus 100. The memory 202 includes, for example, read only memory (ROM), random access memory (RAM), a flash ROM, etc. In particular, for example, the flash ROM and the ROM store therein various types of programs; and the RAM is used as a work area of the CPU 201. The programs stored by the memory 202 are loaded onto the CPU 201, whereby encoded processes are executed by the CPU 201.

The network I/F 203 is connected to a network 210 through a communications line and is connected to another computer through the network 210. The network I/F 203 administers an internal interface with the network 210 and controls the input and output of data from the other computer. A modem, a LAN adapter, etc., for example, may be adopted as the network I/F 203.

The recording medium I/F 204, under the control of the CPU 201, controls the reading and writing of data with respect to the recording medium 205. The recording medium I/F 204 is, for example, a disk drive, a solid state drive (SSD), a universal serial bus (USB) port, etc. The recording medium 205 is non-volatile memory storing therein data written thereto under the control of the recording medium I/F 204. The recording medium 205 is, for example, a disk, a semiconductor memory, a USB memory, etc. The recording medium 205 may be detachable from the policy improving apparatus 100.

The policy improving apparatus 100 may include, for example, a keyboard, a mouse, a display, a touch panel, a printer, a scanner, etc. in addition to the components above. Further, the policy improving apparatus 100 may omit the recording medium I/F 204 and the recording medium 205.

An example of a functional configuration of the policy improving apparatus 100 will be described with reference to FIG. 3.

Figure 3:
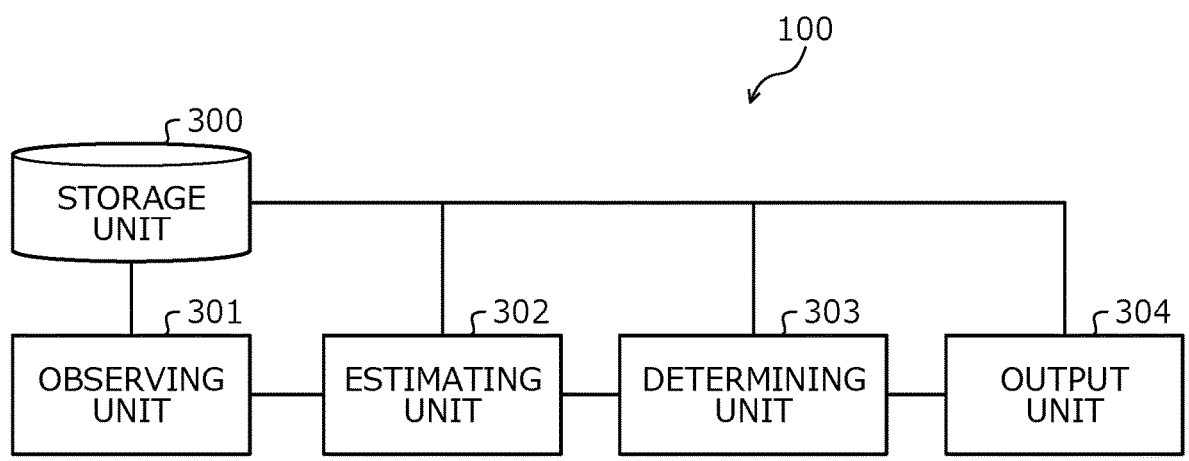
FIG. 3 is a block diagram of an example of a functional configuration of the policy improving apparatus 100.

FIG. 3 is a block diagram of an example of the functional configuration of the policy improving apparatus 100. The policy improving apparatus 100 includes a storage unit 300, an observing unit 301, an estimating unit 302, a determining unit 303, and an output unit 304.

The storage unit 300 is realized by, for example, a storage area such as the memory 202 or the recording medium 205 depicted in FIG. 2. The components from the observing unit 301 to the output unit 304 are functions constituting a control unit. Functions of the components from the observing unit 301 to the output unit 304 are realized by, for example, executing on the CPU 201, the programs stored in a storage area such as the memory 202 or the recording medium 205 depicted in FIG. 2 or by the network I/F 203. Processing results of the functional units are stored to a storage area such as the memory 202 or the recording medium 205 depicted in FIG. 2.

The storage unit 300 accumulates the inputs, the states, and the immediate cost or the immediate reward of the controlled object 110. The storage unit 300 may thereby enable the estimating unit 302 and the determining unit 303 to refer to the inputs, the states, and the immediate cost or the immediate reward of the controlled object 110.

The observing unit 301 observes the states, and the immediate cost or the immediate reward of the controlled object 110, and outputs these items to the storage unit 300. The observing unit 301 may thereby enable the storage unit 300 to accumulate therein the states and the immediate cost or the immediate reward of the controlled object 110.

The estimating unit 302 updates the estimated state-value function acquired by estimating the state-value function. The estimating unit 302 updates the coefficients of the estimated state-value function using, for example, a batch least squares method, a sequential least squares method, a batch LSTD algorithm, or a sequential LSTD algorithm, and thereby updates the estimated state-value function.

For example, the estimating unit 302 updates the estimated state-value function by updating the coefficients of the estimated state-value function at step S604 described with reference to FIG. 6. The estimating unit 302 may thereby use the estimated state-value function to update the feedback coefficient matrix. The estimating unit 302 may also improve the state-value function.

For the batch least squares method, the sequential least squares method, the batch LSTD algorithm, the sequential LSTD algorithm, and the like, Y. Zhu and X. R. Li, "Recursive least squares with linear constraints", Communications in Information and Systems, Vol. 7, No. 3, pp. 287-312, 2007; and Christoph Dann and Gerhard Neumann and Jan Peters, "Policy Evaluation with Temporal Differences: A Survey and Comparison", Journal of Machine Learning Research, Vol. 15, pp. 809-883, 2014, may be referred to.

The estimating unit 302 generates the TD error based on the estimated state-value function acquired by estimating the state-value function by giving the perturbation to each of the components of the feedback coefficient matrix that provides the policy. For example, at steps S802 to S804 described later with reference to FIG. 8, the policy improving apparatus 100 gives the perturbation to each of the components of the feedback coefficient matrix that provides the policy.

For example, at step S805 described later with reference to FIG. 8 and step S901 described later with reference to FIG. 9, the policy improving apparatus 100 may generate the TD error based on the estimated state-value function acquired by estimating the state-value function, the TD error corresponding to the perturbation. The estimating unit 302 may thereby acquire the result of the partial derivative that represents the degree of the reaction to the perturbation for each of the components of the feedback coefficient matrix.

The estimating unit 302 generates the estimated gradient function matrix taking advantage of the state variation of the controlled object 110 being described by the linear difference equation, and the immediate cost or the immediate reward of the controlled object 110 being defined in the quadratic form of the state and the input. The estimated gradient function matrix is a matrix acquired by estimating the gradient function matrix of the state-value function concerning the feedback coefficient matrix for the state of the controlled object 110. The estimating unit 302 generates the estimated gradient function matrix based on, for example, the TD error and the perturbation.

For example, the estimating unit 302 correlates with each other, the result acquired by dividing the TD error calculated for each of the components of the feedback coefficient matrix by the perturbation and the result acquired by differentiating the state-value function with respect to each of the components of the feedback coefficient matrix and thereby, generates estimated components acquired by estimating the components of the gradient function matrix. The estimating unit 302 defines the result of the differentiation of the state-value function with respect to each of the components of the feedback coefficient matrix using the product of a vector dependent on the state and a vector not dependent on the state.

For example, at steps S902 to S905 described later with reference to FIG. 9, the estimating unit 302 generates the estimated component acquired by estimating each of the components of the gradient function matrix in a form in which an arbitrary state may be substituted therein. The estimating unit 302 generates the estimated gradient function matrix acquired by estimating the gradient function matrix at step S1001 described later with reference to FIG. 10.

The estimating unit 302 uses equation (16) that is described later and formed by correlating with each other, the results acquired by dividing the TD error calculated for each of the components of the feedback coefficient matrix by the perturbation, and the results acquired by differentiating the state-value function with respect to each of the components of the feedback coefficient matrix.

When the estimating unit 302 generates the estimated component acquired by estimating each of the components of the gradient function matrix, the estimating unit 302 may use the batch least squares method, the sequential least squares method, the batch LSTD algorithm, the sequential LSTD algorithm, or the like. The estimating unit 302 may thereby generate the estimated gradient function matrix in which an arbitrary state may be substituted therein.

The estimating unit 302 updates the feedback coefficient matrix using the estimated gradient function matrix. For example, the estimating unit 302 updates the feedback coefficient matrix using the estimated gradient function matrix at step S1002 described later with reference to FIG. 10. The estimating unit 302 may thereby update the feedback coefficient matrix based on an estimated value of the estimated gradient function matrix in which the state is substituted therein.

The determining unit 303 determines the input value for the controlled object 110 based on the policy that uses the updated feedback coefficient matrix. The determining unit 303 may thereby determine the input value with which the accumulated cost or the accumulated reward may be optimized.

The output unit 304 outputs the determined input value to the controlled object 110. The output unit 304 outputs the determined input value to the storage unit 300. The output unit 304 may thereby store the input value to the storage unit 300 and enable the estimating unit 302 and the determining unit 303 to refer to the input value.

EXAMPLE of the reinforcement learning will be described. In EXAMPLE, the state equation and the immediate cost equation in the quadratic form, of the controlled object 110 are defined by equations (1) to (9) below and the problem setting is executed. In EXAMPLE, the state of the controlled object 110 is directly observable.

$$x_{t+1} = Ax_t + Bu_t \tag{1}$$

Equation (1) is the state equation of the controlled object 110. "t" is the time indicated as a multiple of a unit time period. "t+1" is the next time when the unit time period elapses from the time t. "$x_{t+1}$" is the state at the next time t+1. "$x_t$" is the state at the time t. "$u_t$" is the input at the time t. "A" and "B" are each a coefficient matrix. Equation (1) represents that a relationship of the state $x_{t+1}$ with the state $x_t$ at the time t is determined by the input $u_t$ at the time t. The coefficient matrices A and B are unknown.

$$x_0 \in \mathbb{R}^n \tag{2}$$

Equation (2) represents that the state $x_o$ is n-dimensional. "n" is known.

$$u_t \in \mathbb{R}^m, t=0,1,2, \tag{3}$$

Equation (3) represents that the input $u_t$ is m-dimensional.

$$A \in \mathbb{R}^{n \times n}, B \in \mathbb{R}^{n \times m} \tag{4}$$

Equation (4) represents that the coefficient matrix A is n×n-dimensional (has n lines and n columns) and the coefficient matrix B is n×m-dimensional (has n lines and m columns). (A,B) is stabilizable.

$$c_t = c(x_t, u_t) = x_t^T Q x_t + u_t^T R u_t \tag{5}$$

Equation (5) is the immediate cost equation of the controlled object 110. "$c_t$" is the immediate cost that is generated after a unit time period corresponding to the input $u_t$ at the time t. The superscript "T" represents transposition. Equation (5) represents that the immediate cost $c_t$ is in a relationship determined by the quadratic form of the state $x_t$ at the time t and the input $u_t$ at the time t. The coefficient matrices Q and R are unknown. The immediate cost $c_t$ is directly observable.

$$Q \in \mathbb{R}^{n \times n}, Q = Q^T \geq O, R \in \mathbb{R}^{m \times m}, R = R^T > 0 \tag{6}$$

Equation (6) represents that the coefficient matrix Q is n×n-dimensional. "≥0" represents a positive semi-definite symmetric matrix. Further, equation (6) represents that the coefficient matrix R is m×m-dimensional. ">0" represents a positive symmetric definite matrix.

$$u_t = F_t x_t + \varepsilon_t \tag{7}$$

"$F_t$" is the feedback coefficient matrix used at the time t and represents the coefficient matrix concerning the state $x_t$. Equation (7) is an equation for determining the input $u_t$ at the time t based on the state $x_t$ at the time t.

$$F_t \in \mathbb{R}^{m \times n}, t=0,1,2,\ldots \tag{8}$$

Equation (8) represents that the feedback coefficient matrix $F_t$ is m×n-dimensional. In the following description, the feedback coefficient matrix $F_t$ may simply be written as "feedback coefficient matrix F". A specific example will be described where the policy improving apparatus 100 updates the feedback coefficient matrix F.

The policy improving apparatus 100 adds a perturbation to the component $F_{ij}$ of (i,j) of the feedback coefficient matrix F. "(i,j)" is an index that identifies a component of a matrix. The index (i,j) identifies, for example, the component in the line i and the column j of the matrix F.

For example, the policy improving apparatus 100 adds a perturbation to the component $F_{ij}$ of (i,j) of the feedback coefficient matrix F in accordance with a mathematical expression of "the feedback coefficient matrix $F+\varepsilon E_{ij}$". "$E_{ij}$" is an m×n-dimensional matrix whose component identified by the index (i,j) is 1 and whose components are all 0 except this component. "$\varepsilon$" is a real number.

The policy improving apparatus 100 generates the input using "the feedback coefficient matrix $F+\varepsilon E_{ij}$" instead of Ft of equation (8). The TD error may be represented by a partial differential coefficient of the state-value function concerning the component $F_{ij}$ of (i,j) of the feedback coefficient matrix F.

The state-value function is represented in the quadratic form like equation (9) below when the state variation of the controlled object 110 follows the linear time-invariant dynamics and the immediate cost is represented in the quadratic form.

$$V(x:F) = x^T P_F x \qquad (9)$$

The function $\partial V/\partial F_{ij}(x:F)$ acquired by partially differentiating the state-value function with respect to the component $F_{ij}$ of (i,j) of the feedback coefficient matrix F is represented in the quadratic form as equation (11) below. In the following description, the partially differentiated function may be written as "partial derivative".

$$\frac{\partial V}{\partial F_{ij}}(x:F) = x^T \frac{\partial P_F}{\partial F_{ij}} x \qquad (10)$$

Using equation (10), the policy improving apparatus 100 calculates an estimated function of the partial derivative $\partial V/\partial F_{ij}(x:F)$ concerning the component Fij of (i,j) of the feedback coefficient matrix F. In the following description, the estimated function may be described like, for example, equation (11) below by attaching "^" in the upper portion of the partial derivative $\partial V/\partial F_{ij}(x:F)$.

$$\frac{\partial \tilde{V}}{\partial F_{ij}}(x:F) \qquad (11)$$

The policy improving apparatus 100 similarly calculates the estimated function of the partial derivative $\partial V/\partial F_{ij}(x:F)$ by adding the perturbation to each of the components of the feedback coefficient matrix F. Using the estimated function of the partial derivative $\partial V/\partial F_{ij}$, the policy improving apparatus 100 generates an estimated gradient function matrix acquired by estimating the gradient function matrix $\nabla_F V(x:F)$ of the feedback coefficient matrix. In the following description, the estimated gradient function matrix may be described like, for example, equation (12) below by attaching "^" in the upper portion of the gradient function matrix $\nabla_F V(x:F)$.

$$\widetilde{\nabla_F V}(x:F) \qquad (12)$$

The policy improving apparatus 100 may thereby generate an estimated matrix of the matrix $\partial P_F/\partial F_{ij}$ in a form separated from the state x like equation (10). Therefore, the policy improving apparatus 100 may calculate the estimated gradient function matrix acquired by estimating the gradient function matrix $\nabla_F V(x:F)$ at a certain time, in a form in which an arbitrary state x may be substituted therein. When the policy improving apparatus 100 calculates the estimated value of the gradient function matrix $\nabla_F V(x:F)$ for a certain state at the time and thereafter, the policy improving apparatus 100 only has to substitute this state in the estimated gradient function matrix that is already calculated.

In this manner, the policy improving apparatus 100 may generate the estimated gradient function matrix acquired by estimating the gradient function matrix $\nabla_F V(x:F)$ that is usable at a certain time and thereafter, and not an estimated value of the gradient function matrix $\nabla_F V(x:F)$ for a certain state x. Therefore, the policy improving apparatus 100 may execute relatively easily the calculation of the estimated value of the gradient function matrix $\nabla_F V(x:F)$ for each of various states, and may facilitate reduction of the processing amount.

To generate the estimated gradient function matrix acquired by estimating the gradient function matrix $\nabla_F V(x:F)$ based on an input, a state, and an immediate cost that are actually observed, the policy improving apparatus 100 may accurately generate the estimated gradient function matrix acquired by estimating the gradient function matrix $\nabla_F V(x:F)$.

The policy improving apparatus 100 may also update the feedback coefficient matrix F to efficiently minimize the accumulated cost. Therefore, the policy improving apparatus 100 may facilitate reduction of the time period necessary for the state of the controlled object 110 to be established as an advantageous state. For example, the policy improving apparatus 100 may facilitate reduction of the time period necessary for the state of the controlled object 110 to be established as an advantageous state, compared to that of the technique of the reinforcement learning that does not use the gradient function matrix $\nabla_F V(x:F)$.

When the policy improving apparatus 100 updates the feedback coefficient matrix F based on the estimated gradient function matrix acquired by estimating the gradient function matrix $\nabla_F V(x:F)$, the policy improving apparatus 100 may also adjust the degree of the variation of the feedback coefficient matrix F. The policy improving apparatus 100 may, therefore, prevent any adverse influence and the like on the controlled object 110 by abrupt variation of the feedback coefficient matrix F.

For example, a case may be considered where the degree of the variation of the feedback coefficient matrix F cannot be adjusted even at a stage where the state-value function is to be not accurately estimated yet. In this case, the feedback coefficient matrix F may abruptly be varied and become a disadvantageous coefficient matrix, making it difficult to control the controlled object 110 so that the accumulated cost or the accumulated reward is optimized, and the stability of the controlled object 110 may therefore be lost. In contrast, because the policy improving apparatus 100 adjusts the degree of the variation of the feedback coefficient matrix F, the policy improving apparatus 100 may adjust the degree of the variation of the feedback coefficient matrix F and avoid any abrupt variation of the feedback coefficient matrix F even at a stage where the state-value function is not to be accurately estimated yet.

The policy improving apparatus 100 may calculate a statistical value of the estimated value of the gradient function matrix $\nabla_F V(x:F)$ based on the result of the calculation of the estimated value of the gradient function matrix $\nabla_F V(x:F)$ for each of the states at various times. The policy improving apparatus 100 may therefore facilitate the updating of the feedback coefficient matrix F for the accumulated cost to efficiently be minimized.

A specific example of the controlled object 110 will be described with reference to FIGS. 4 and 5.

Figure 4:
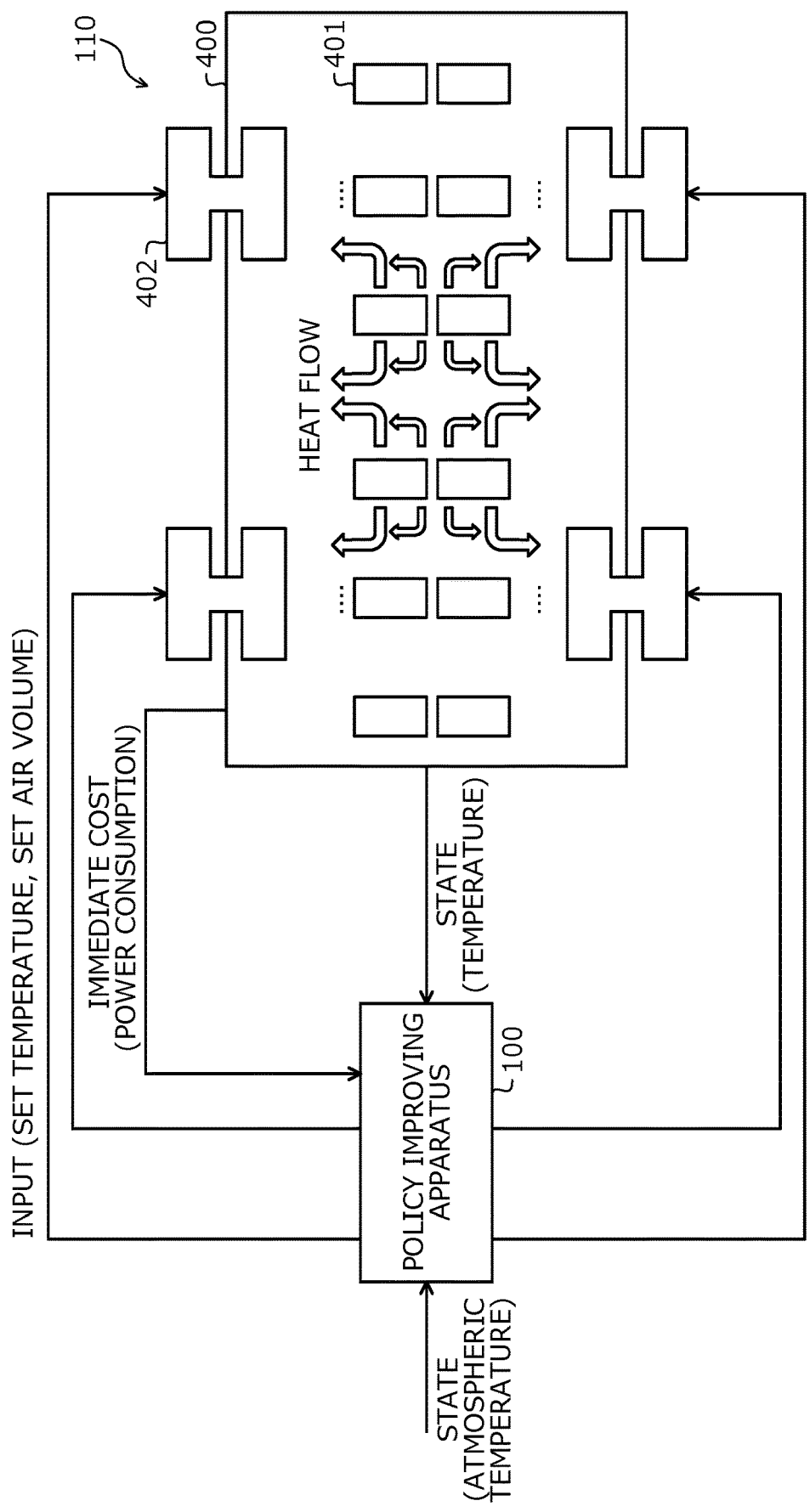
FIG. 4 is an explanatory diagram of a specific example of a controlled object 110.
Figure 5:
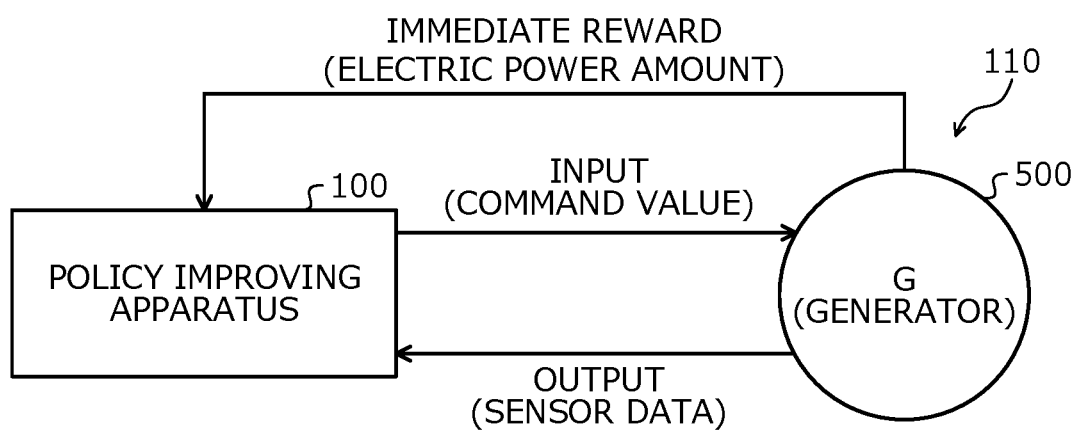
FIG. 5 is an explanatory diagram of a specific example of the controlled object 110.

FIGS. 4 and 5 are explanatory diagrams each of a specific example of the controlled object 110. In the example of FIG. 4, the controlled object 110 is a server room 400 that includes a server 401 that is a heat source, and a cooler 402 such as a CRAC or a chiller. The input is a set temperature or a set air volume for the cooler 402. The state is sensor data from a sensor device disposed in the server room 400, or the like, and is, for example, a temperature or the like. The state may be data concerning the controlled object 110, acquired from an object other than the controlled object 110 and may be, for example, a temperature, the weather, or the like. The immediate cost is, for example, the power consumption of the server room 400 for 5 minutes. The value function is, for example, the accumulated power consumption of the server room 400.

The policy improving apparatus 100 may update the feedback coefficient matrix F to efficiently minimize the accumulated power consumption that is the accumulated cost. Therefore, the policy improving apparatus 100 may facilitate reduction of the time period necessary for the accumulated power consumption of the controlled object 110 to be minimized, and may facilitate reduction of the operation cost of the server room 400. Even when variation of the use situation of the server 401, variation of the atmospheric temperature, or the like occurs, the policy improving apparatus 100 may efficiently minimize the accumulated power consumption in a relatively short time period from the variation.

In the example of FIG. 5, the controlled object 110 is an electric generator 500. The input is a command value to the electric generator 500. The state is sensor data from a sensor device disposed in the electric generator 500 and is, for example, the generated electric power amount of the electric generator 500, the rotation amount of a turbine of the electric generator 500, or the like. The immediate reward is, for example, the generated electric power amount for 5 minutes of the electric generator 500. The value function is, for example, the accumulated generated electric power amount of the electric generator 500.

The policy improving apparatus 100 may update the feedback coefficient matrix F to efficiently maximize the accumulated generated electric power amount that is the accumulated reward. Therefore, the policy improving apparatus 100 may facilitate reduction of the time period necessary for the accumulated generated electric power amount of the controlled object 110 to be maximized, and may facilitate an increase of the benefit of the electric generator 500. Even when variation of the situation of the electric generator 500 or the like occurs, the policy improving apparatus 100 may efficiently maximize the accumulated generated electric power amount in a relatively short time period from the variation. The controlled object 110 may be, for example, a chemical plant, an autonomous mobile robot, or an industrial robot.

An example of a procedure for a reinforcement learning process will be described with reference to FIGS. 6 and 7.

Figure 6:
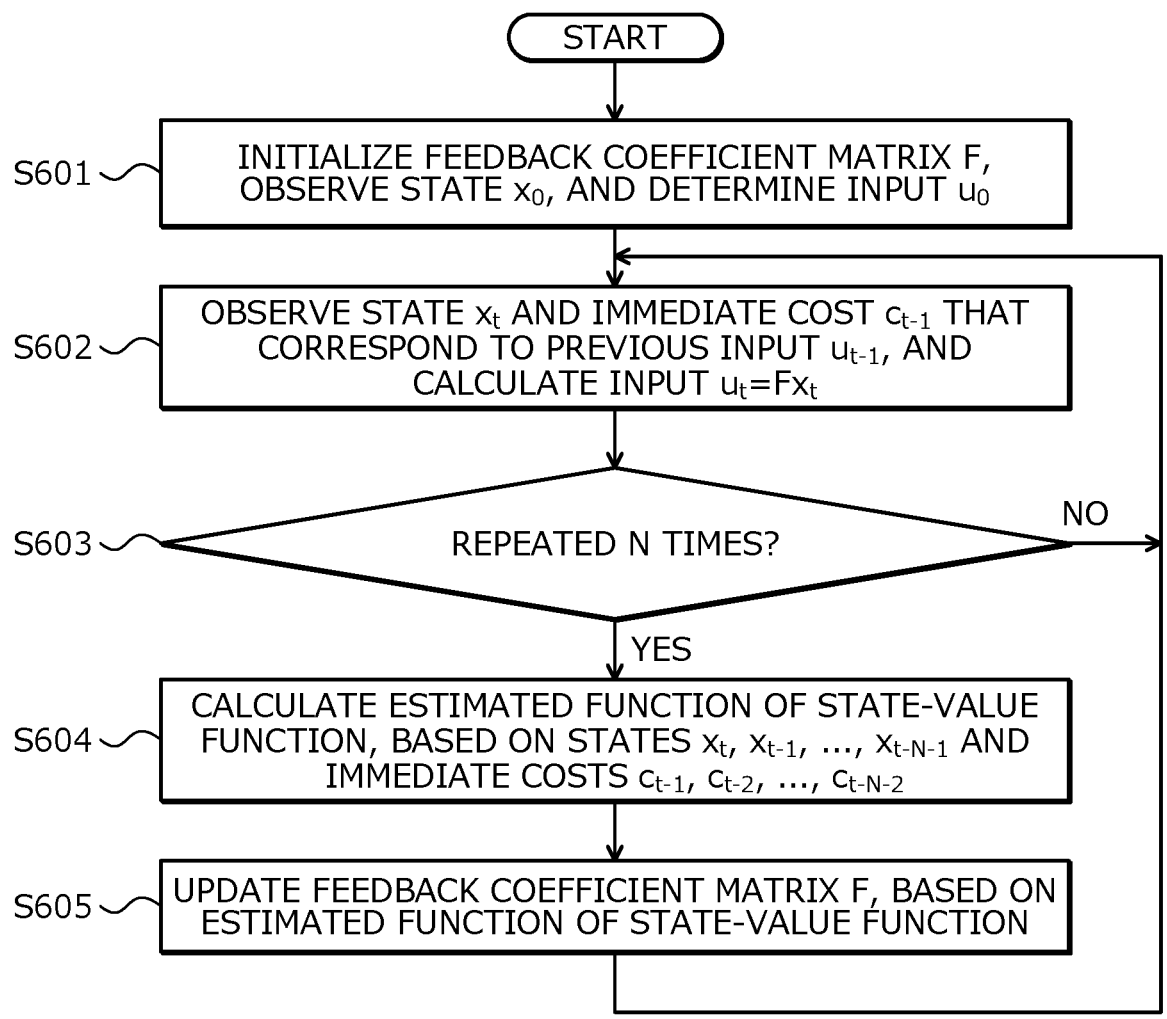
FIG. 6 is a flowchart of an example of a procedure for a reinforcement learning process in a batch processing form.

FIG. 6 is a flowchart of an example of the procedure for the reinforcement learning process in a batch processing form. In FIG. 6, the policy improving apparatus 100 first initializes the feedback coefficient matrix F, observes a state $x_0$, and determines an input $u_0$ (step S601).

The policy improving apparatus 100 observes the state $x_t$ and the immediate cost $c_{t-1}$ that correspond to the previous input $u_{t-1}$, and calculates the input $u_t=Fx_t$ (step S602). The policy improving apparatus 100 determines whether the policy improving apparatus 100 has repeated step S602 N times (step S603).

When the policy improving apparatus 100 determines that the policy improving apparatus 100 has not repeated step S602 N times (step S603: NO), the policy improving apparatus 100 returns to the process at step S602. On the other hand, when the policy improving apparatus 100 determines that the policy improving apparatus 100 has repeated step S602 N times (step S603: YES), the policy improving apparatus 100 moves to the process at step S604.

The policy improving apparatus 100 calculates an estimated function of the state-value function, based on the states $x_t, x_{t-1}, \ldots, X_{t-n-1}$, and the immediate costs $c_{t-1}, c_{t-2}, \ldots, C_{t-N-2}$ (step S604).

The policy improving apparatus 100 updates the feedback coefficient matrix F, based on the estimated function of the state-value function (step S605). The policy improving apparatus 100 returns to the process at step S602. The policy improving apparatus 100 may thereby control the controlled object 110.

Figure 7:
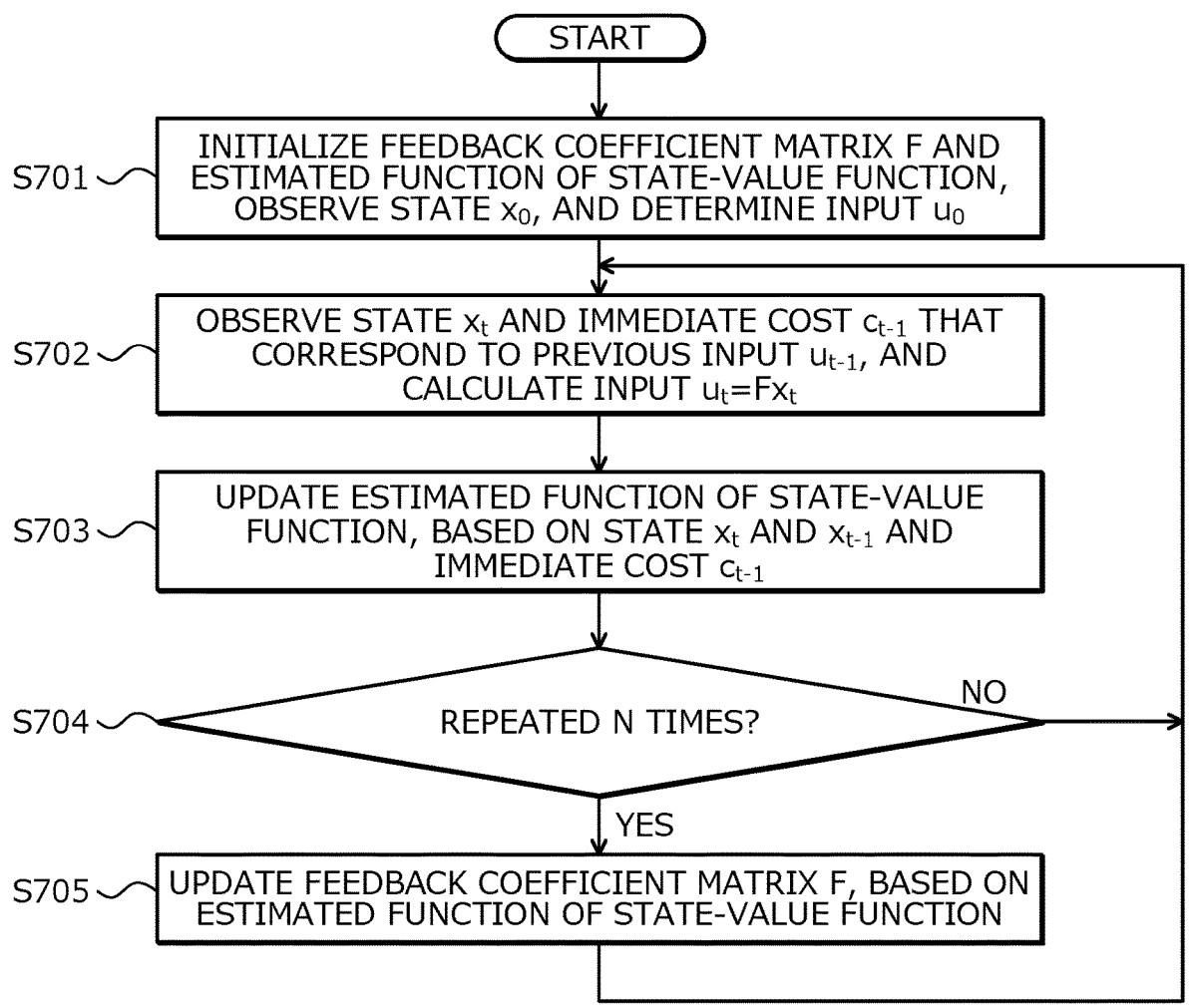
FIG. 7 is a flowchart of an example of a procedure for the reinforcement learning process in a sequential processing form.

FIG. 7 is a flowchart of an example of the procedure for the reinforcement learning process in a sequential processing form. In FIG. 7, the policy improving apparatus 100 first initializes the feedback coefficient matrix F and the estimated function of the state-value function, observes the state $x_0$, and determines the input $u_0$ (step S701).

The policy improving apparatus 100 observes the state $x_t$ and the immediate cost $c_{t-1}$ that correspond to the previous input $u_{t-1}$, and calculates the input $u_t=Fx_t$ (step S702). The policy improving apparatus 100 updates the estimated function of the state-value function, based on the state $x_t$ and $x_{t-1}$ and the immediate cost $c_{t-1}$ (step S703).

The policy improving apparatus 100 determines whether the policy improving apparatus 100 has repeated step S703 N times (step S704). When the policy improving apparatus 100 determines that the policy improving apparatus 100 has not repeated step S703 N times (step S704: NO), the policy improving apparatus 100 returns to the process at step S702. On the other hand, when the policy improving apparatus 100 determines that the policy improving apparatus 100 has repeated step S703 N times (step S704: YES), the policy improving apparatus 100 moves to the process at step S705.

The policy improving apparatus 100 updates the feedback coefficient matrix F, based on the estimated function of the state-value function (step S705). The policy improving apparatus 100 returns to the process at step S702. The policy improving apparatus 100 may thereby control the controlled object 110.

An example of a procedure for a policy improvement process that is a specific example of step S605 and according to which the policy improving apparatus 100 updates the feedback coefficient matrix F and improves the policy will be described with reference to FIG. 8.

Figure 8:
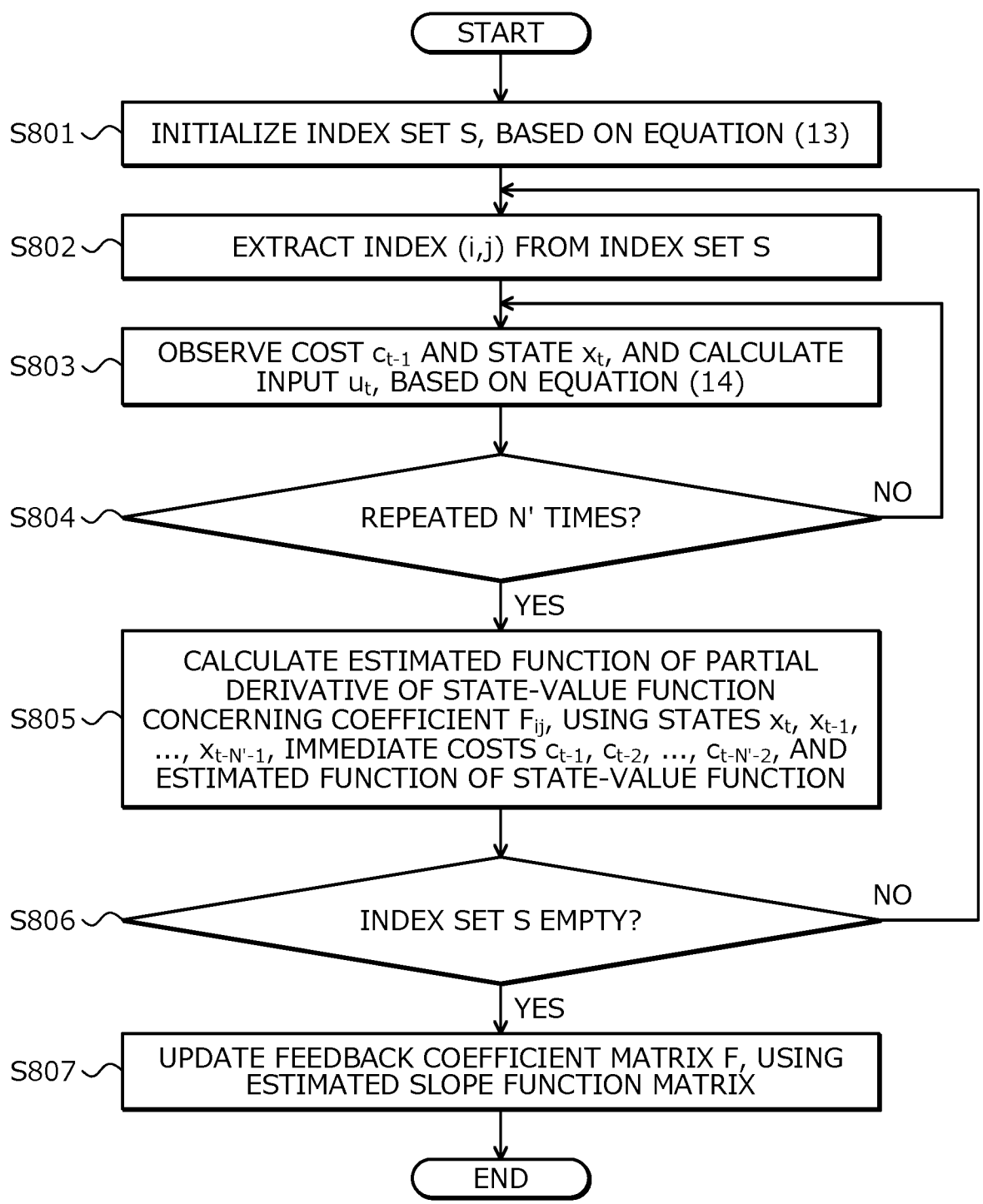
FIG. 8 is a flowchart of an example of a procedure for a policy improvement process.

FIG. 8 is a flowchart of an example of the procedure for the policy improvement process. In FIG. 8, the policy improving apparatus 100 first initializes an index set S based on equation (13) below (step S801).

$$S=\{(i,j) | i \in \{1,2,\ldots,m\}, j \in \{1,2,\ldots,n\}\} \qquad (13)$$

"(i,j)" is an index identifying a component of a matrix. The index (i,j) identifies, for example, the component in a line i and a column j of the matrix. In the following description, "m" is the number of the lines of the feedback coefficient matrix F. "n" is the number of the columns of the feedback coefficient matrix F.

The policy improving apparatus 100 extracts the index (i,j) from the index set S (step S802). The policy improving apparatus 100 observes the cost $c_{t-1}$ and the state $x_t$, and calculates the input $u_t$ based on equation (14) below (step S803).

$$u_t = (F + \varepsilon E_{ij})x_t \quad (14)$$

The policy improving apparatus 100 determines whether the policy improving apparatus 100 has repeated step S803 N' times (step S804). When the policy improving apparatus 100 determines that the policy improving apparatus 100 has not repeated step S803 N' times (step S804: NO), the policy improving apparatus 100 returns to the process at step S803. On the other hand, when the policy improving apparatus 100 determines that the policy improving apparatus 100 has repeated step S803 N' times (step S804: YES), the policy improving apparatus 100 moves to the process at step S805.

The policy improving apparatus 100 calculates an estimated function of the partial derivative of the state-value function concerning the coefficient $F_{ij}$, using the states $x_t$, $x_{t-1}$, ..., and $x_{t-N'-1}$, the immediate costs $c_{t-1}$, $c_{t-2}$, ..., and $c_{t-N'-2}$, and the estimated function of the state-value function (step S805).

The policy improving apparatus 100 determines whether the index set S is empty (step S806). When the policy improving apparatus 100 determines that the index set S is not empty (step S806: NO), the policy improving apparatus 100 returns to the process at step S802. On the other hand, when the policy improving apparatus 100 determines that the index set S is empty (step S806: YES), the policy improving apparatus 100 moves to the process at step S807.

The policy improving apparatus 100 updates the feedback coefficient matrix F using the estimated gradient function matrix (step S807). The policy improving apparatus 100 causes the policy improvement process to come to an end.

An example of the procedure for an estimation process that is a specific example of step S805 and according to which the estimated function of the partial derivative of the state-value function concerning the coefficient Fij will be described with reference to FIG. 9.

Figure 9:
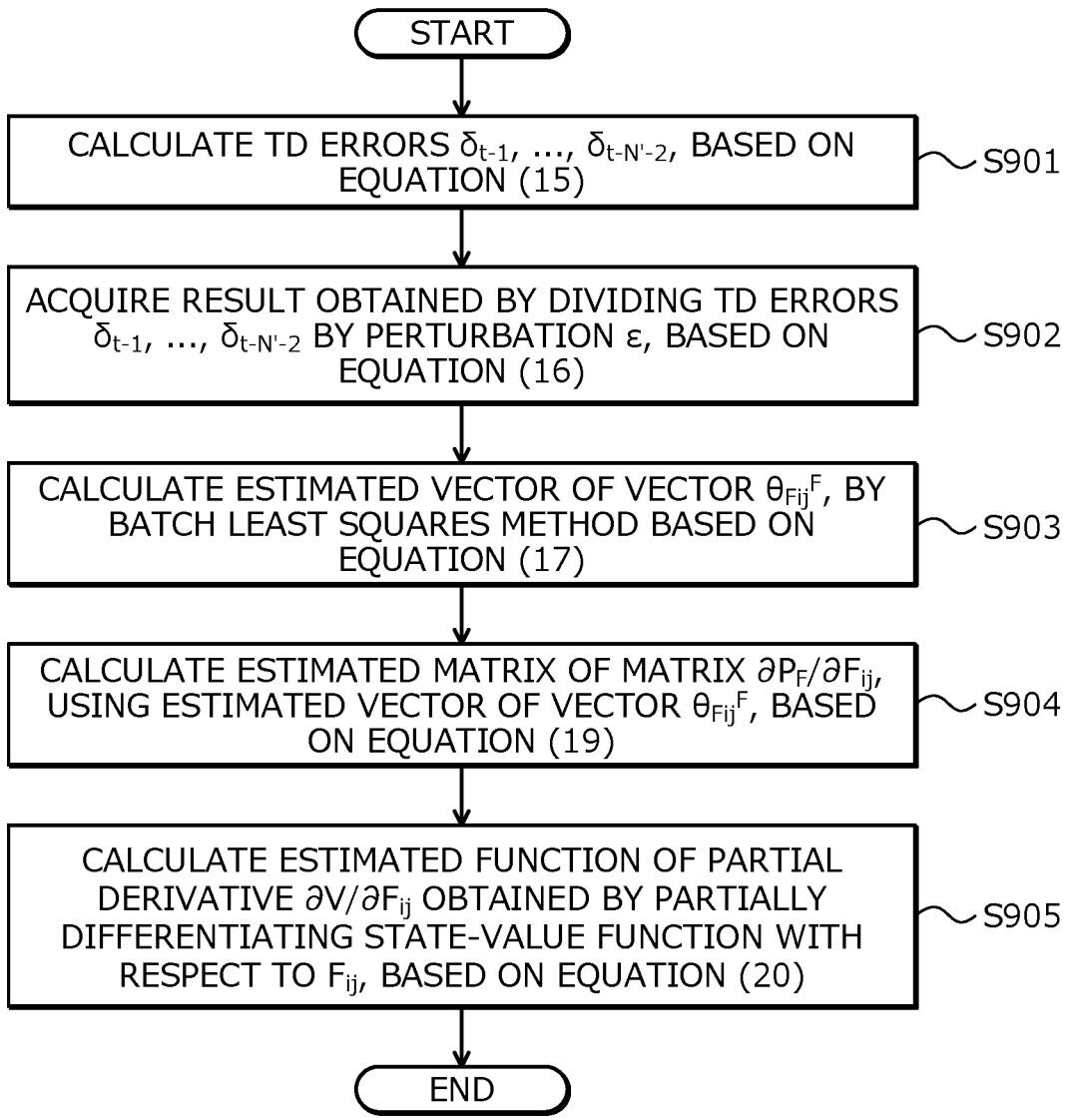
FIG. 9 is a flowchart of an example of a procedure for an estimation process.

FIG. 9 is a flowchart of an example of the procedure for the estimation process. In FIG. 9, the policy improving apparatus 100 calculates the TD errors $\delta_{t-1}$, ..., and $\delta_{t-N'-2}$ based on equation (15) below (step S901).

$$\delta_{t-1} := c_{t-1} - \{\hat{V}(x_{t-1}:F) - \gamma\hat{V}(x_t:F)\} \quad (15)$$
$$\delta_{t-2} := c_{t-2} - \{\hat{V}(x_{t-2}:F) - \gamma\hat{V}(x_{t-1}:F)\}$$
$$\vdots$$
$$\delta_{t-N'-2} := c_{t-N'-2} - \{\hat{V}(x_{t-N'-2}:F) - \gamma\hat{V}(x_{t-N'-1}:F)\}$$

The policy improving apparatus 100 acquires the result acquired by dividing the TD errors $\delta_{t-1}$, $\delta_{t-N'-2}$ by the perturbation $\varepsilon$, based on equation (16) below (step S902).

$$\frac{1}{\varepsilon}\delta_{t-1}, \frac{1}{\varepsilon}\delta_{t-2}, \ldots \frac{1}{\varepsilon}\delta_{t-N'-2} \quad (16)$$

The policy improving apparatus 100 calculates an estimated vector of a vector $\theta_{Fij}^F$, by the batch least squares method based on equation (17) below (step S903).

$$\hat{\theta}_{F_{ij}}^F := \begin{bmatrix} \{(x_{t-1} \otimes x_{t-1}) - \gamma(x_t \otimes x_t)\}^T \\ \{(x_{t-2} \otimes x_{t-2}) - \gamma(x_{t-1} \otimes x_{t-1})\}^T \\ \vdots \\ \{(x_{t-N'-2} \otimes x_{t-N'-2}) - \gamma(x_{t-N'-1} \otimes x_{t-N'-1})\}^T \end{bmatrix}^\dagger \begin{bmatrix} \frac{1}{\varepsilon}\delta_{t-1} \\ \frac{1}{\varepsilon}\delta_{t-2} \\ \vdots \\ \frac{1}{\varepsilon}\delta_{t-N'-2} \end{bmatrix} \quad (17)$$

"T" represents transposition. A symbol having ○ and × overlapped therein on each other represents the Kronecker value. "†" represents a Moore-Penrose generalized inverse matrix.

Equation (17) is acquired by forming an approximation equality of a vector corresponding to equation (16), and the product of an estimated vector of the vector $\theta_{Fij}^F$ not dependent on the state and a matrix dependent on the state defined in accordance with equation (18) below, and transforming the approximation equality.

$$\begin{bmatrix} \{(x_{t-1} \otimes x_{t-1}) - \gamma(x_t \otimes x_t)\}^T \\ \{(x_{t-2} \otimes x_{t-2}) - \gamma(x_{t-1} \otimes x_{t-1})\}^T \\ \vdots \\ \{(x_{t-N'-2} \otimes x_{t-N'-2}) - \gamma(x_{t-N'-1} \otimes x_{t-N'-1})\}^T \end{bmatrix} \quad (18)$$

The product of the estimated vector of the vector $\theta_{Fij}^F$ not dependent on the state and the matrix dependent on the state defined in accordance with equation (18) corresponds to the result acquired by differentiating the state-value function with respect to the (i,j) component of the feedback coefficient matrix F.

The policy improving apparatus 100 generates an estimated matrix of the matrix $\partial P_F / \partial F_{ij}$, using the estimated vector of the vector $\delta_{Fij}^F$, based on equation (19) below (step S904).

$$\widehat{\frac{\partial P_F}{\partial F_{ij}}} : vec_{n \times n}^{-1}(\hat{\theta}_{F_{ij}}^F) \quad (19)$$

"$vec^{-1}$" is a symbol for inverse-transforming a vector into a matrix.

The policy improving apparatus 100 calculates an estimated function of the partial derivative $\partial V / \partial F_{ij}$ acquired by partially differentiating the state-value function with respect to $F_{ij}$, based on equation (20) below (step S905). The policy improving apparatus 100 causes the estimation process to come to an end.

$$\widehat{\frac{\partial V}{\partial F_{ij}}}(x:F) = x^T \widehat{\frac{\partial P_F}{\partial F_{ij}}} x \quad (20)$$

An example of the procedure for an updating process that is a specific example of step S807 and according to which the policy improving apparatus 100 updates the feedback coefficient matrix F will be described with reference to FIG. 10.

Figure 10:
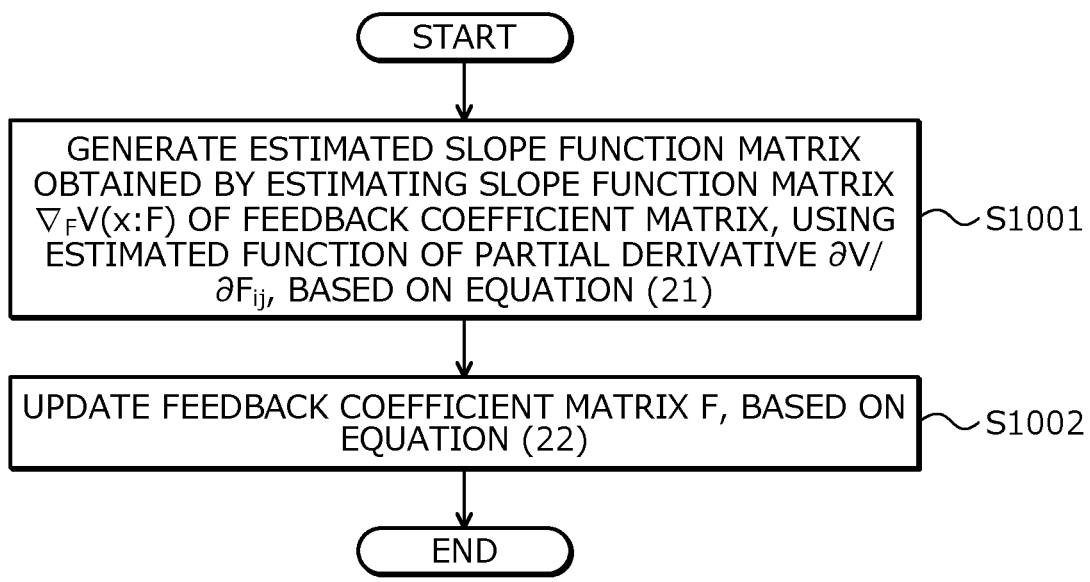
FIG. 10 is a flowchart of an example of a procedure for an updating process.

FIG. 10 is a flowchart of an example of the procedure for the updating process. In FIG. 10, the policy improving apparatus 100 first generates an estimated gradient function matrix acquired by estimating the gradient function matrix $\nabla_F V(x:F)$ of the feedback coefficient matrix using the estimated function of the partial derivative $\partial V/\partial F_{ij}$ based on equation (21) below (step S1001).

$$\nabla_F V(x:F) = \begin{pmatrix} x^T \widehat{\frac{\partial P_F}{\partial F_{11}}} x & \cdots & x^T \widehat{\frac{\partial P_F}{\partial F_{1n}}} x \\ \vdots & \ddots & \vdots \\ x^T \widehat{\frac{\partial P_F}{\partial F_{m1}}} x & \cdots & x^T \widehat{\frac{\partial P_F}{\partial F_{mn}}} x \end{pmatrix} \quad (21)$$

$$= \begin{pmatrix} (x \otimes x)^T \hat{\theta}^F_{F_{11}} & \cdots & (x \otimes x)^T \hat{\theta}^F_{F_{1n}} \\ \vdots & \ddots & \vdots \\ (x \otimes x)^T \hat{\theta}^F_{F_{m1}} & \cdots & (x \otimes x)^T \hat{\theta}^F_{F_{mn}} \end{pmatrix}$$

$$= \begin{pmatrix} (x \otimes x)^T & & 0 \\ & \ddots & \\ 0 & & (x \otimes x)^T \end{pmatrix} \begin{pmatrix} \hat{\theta}^F_{F_{11}} & \cdots & \hat{\theta}^F_{F_{1n}} \\ \vdots & \ddots & \vdots \\ \hat{\theta}^F_{F_{m1}} & \cdots & \hat{\theta}^F_{F_{mn}} \end{pmatrix}$$

$$= (I \otimes (x \otimes x)^T) \begin{pmatrix} \hat{\theta}^F_{F_{11}} & \cdots & \hat{\theta}^F_{F_{1n}} \\ \vdots & \ddots & \vdots \\ \hat{\theta}^F_{F_{m1}} & \cdots & \hat{\theta}^F_{F_{mn}} \end{pmatrix}$$

The policy improving apparatus 100 updates the feedback coefficient matrix F based on equation (22) below (step S1002).

$$F \leftarrow F - \alpha (\Sigma_{k=1}^M \widehat{\nabla_F V} (x^{[s]};F)) \quad (22)$$

"α" is a weight. The policy improving apparatus 100 causes the updating process to come to an end. The policy improving apparatus 100 may thereby improve the state-value function and update the feedback coefficient matrix F so that the accumulated cost or the accumulated reward is efficiently optimized. The policy improving apparatus 100 may generate the estimated gradient function matrix in which an arbitrary x may be substituted therein.

While a case where the policy improving apparatus 100 realizes the reinforcement learning based on the immediate cost has been described, the item to be based on is not limited hereto. For example, the policy improving apparatus 100 may realize the reinforcement learning based on the immediate reward. In this case, the policy improving apparatus 100 uses equation (23) below instead of equation (22).

$$F \leftarrow F + \alpha (\Sigma_{k=1}^M \widehat{\nabla_F V} (x^{[k]};F)) \quad (23)$$

As described, according to the policy improving apparatus 100, the TD error based on the estimated state-value function acquired by estimating the state-value function may be calculated by giving the perturbation to each of the components of the feedback coefficient matrix that provides the policy. According to the policy improving apparatus 100, the estimated gradient function matrix acquired by estimating the gradient function matrix of the state-value function concerning the feedback coefficient matrix for the state of the controlled object 110 may be calculated based on the TD error and the perturbation. According to the policy improving apparatus 100, the feedback coefficient matrix may be updated using the estimated gradient function matrix. The policy improving apparatus 100 may thereby efficiently improve the policy based on the feedback coefficient matrix.

According to the policy improving apparatus 100, the results acquired by dividing the TD error calculated for each of the components of the feedback coefficient matrix by the perturbation, and the results acquired by differentiating the state-value function with respect to each of the components of the feedback coefficient matrix may be correlated with each other and thereby, the components of the gradient function matrix may be estimated. The policy improving apparatus 100 may thereby generate the estimated gradient function matrix in the form in which the state may be substituted therein.

According to the policy improving apparatus 100, the result acquired by differentiating the state-value function with respect to each of the components of the feedback coefficient matrix may be defined by the product of the vector dependent on the state and the vector not dependent on the state. The policy improving apparatus 100 may thereby generate the estimated gradient function matrix in the form in which an arbitrary state may be substituted therein.

The policy improving method described in the present embodiment may be realized by causing a computer such as a personal computer, a work station, or a microcontroller to execute the programs prepared in advance. The policy improving program described in the present embodiment is recorded in a computer-readable recording medium such as a hard disk, a flexible disk, a CD-ROM, an MO, or a DVD, and is executed by being read by a computer from the recording medium. The policy improving program described in the present embodiment may be distributed through a network such as the Internet.

According to an aspect of the present invention, an effect is achieved in that a feedback coefficient matrix may be generated that provides a policy for optimizing accumulated cost or accumulated reward.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing therein a policy improvement program of reinforcement learning by a state-value function, the policy improvement program causing a computer to execute a process of controlling a physical system, comprising:
   calculating a temporal difference error based on an estimated state-value function that is acquired by estimating a state-value function related to the physical system, the temporal difference error being calculated by giving a perturbation to each of a plurality of components of a feedback coefficient matrix that provides a policy;
   calculating based on the temporal difference error and the perturbation, an estimated gradient function matrix acquired by estimating a gradient function matrix of the state-value function with respect to the feedback coefficient matrix for a state of a controlled object in the physical system, a state variation of the controlled object in the reinforcement learning being described by a linear difference equation and an immediate cost or an immediate reward of the controlled object being described in a quadratic form of the state and an input;

updating the feedback coefficient matrix using the estimated gradient function matrix; and generating a control input that results in control of the physical system, based on the feedback coefficient matrix.

2. The recording medium according to claim 1, wherein the calculating of the estimated gradient function matrix includes estimating components of the gradient function matrix, by correlating a first result acquired by dividing the temporal difference error calculated for each of the plurality of components of the feedback coefficient matrix by the perturbation, and a second result acquired by differentiating the state-value function with respect to each of the plurality of components of the feedback coefficient matrix.

3. The recording medium according to claim 1, wherein a result acquired by differentiating the state-value function with respect to each of the plurality of components of the feedback coefficient matrix is defined by a product of a vector dependent on the state and a vector not dependent on the state.

4. The recording medium according to claim 1, wherein the state-value function is described in a quadratic form of the state of the controlled object.

5. The recording medium according to claim 1, wherein the physical system is a server room, the controlled object is a cooler in the server room, the state is temperature in the server room and the control input is a set temperature of the cooler.

6. The recording medium according to claim 1, wherein the physical system is an electricity generation system, the controlled object is an electric generator, the state is sensor data from a sensor in the electric generator and the control input is a command value of the electric generator.

7. A method of controlling a physical system based on policy improvement of reinforcement learning by a state-value function, the method comprising:

calculating, by a computer, a temporal difference error based on an estimated state-value function that is acquired by estimating the state-value function related to the physical system, the temporal difference error being calculated by giving a perturbation to each of a plurality of components of a feedback coefficient matrix that provides a policy;

calculating by the computer and based on the temporal difference error and the perturbation, an estimated gradient function matrix acquired by estimating a gradient function matrix of the state-value function with respect to the feedback coefficient matrix for a state of a controlled object in the physical system, a state variation of the controlled object in the reinforcement learning being described by a linear difference equation and an immediate cost or an immediate reward of the controlled object being described in a quadratic form of the state and an input;

updating by the computer, the feedback coefficient matrix using the estimated gradient function matrix; and generating a control input that results in control of the physical system, based on the feedback coefficient matrix.

8. The method according to claim 7, wherein the physical system is a server room, the controlled object is a cooler in the server room, the state is temperature in the server room and the control input is a set temperature of the cooler.

9. The method according to claim 7, wherein the physical system is an electricity generation system, the controlled object is an electric generator, the state is sensor data from a sensor in the electric generator and the control input is a command value of the electric generator.

10. A control apparatus controlling a physical system by of reinforcement learning by a state-value function, comprising:

a memory;

a processor circuitry coupled to the memory, the processor circuitry configured to:

calculate a temporal difference error based on an estimated state-value function that is acquired by estimating the state-value function, the temporal difference error being calculated by giving a perturbation to each of a plurality of components of a feedback coefficient matrix that provides a policy;

calculate based on the temporal difference error and the perturbation, an estimated gradient function matrix acquired by estimating a gradient function matrix of the state-value function with respect to the feedback coefficient matrix for a state of a controlled object in the physical system, a state variation of the controlled object in the reinforcement learning being described by a linear difference equation and an immediate cost or an immediate reward of the controlled object being described in a quadratic form of the state and an input;

update the feedback coefficient matrix using the estimated gradient function matrix, and generate a control input that controls the physical system, based on the feedback coefficient matrix; and an interface, coupled to the processor circuitry and the physical system, sending the control input to the physical system, resulting in control of the physical system.

11. The control apparatus according to claim 10, wherein the physical system is a server room, the controlled object is a cooler in the server room, the state is temperature in the server room and the control input is a set temperature of the cooler.

12. The control apparatus according to claim 10, wherein the physical system is an electricity generation system, the controlled object is an electric generator, the state is sensor data from a sensor in the electric generator and the control input is a command value of the electric generator.

* * * * *